United States Patent [19]
Knop

[11] 4,318,123
[45] Mar. 2, 1982

[54] SOLID-STATE, COLOR-ENCODING TELEVISION CAMERA

[75] Inventor: Karl H. Knop, Zurich, Switzerland
[73] Assignee: RCA Corporation, New York, N.Y.
[21] Appl. No.: 156,888
[22] Filed: Jun. 5, 1980
[51] Int. Cl.³ ............................................. H04N 9/07
[52] U.S. Cl. ...................................... 358/43; 358/44; 358/55
[58] Field of Search ...................... 358/43, 44, 45, 46, 358/47, 48, 50, 55, 213

[56] References Cited
U.S. PATENT DOCUMENTS
3,588,326 6/1971 Frohbach .............................. 358/43
3,860,955 1/1975 Shinozaki .............................. 358/44
3,940,788 2/1976 Abe ...................................... 358/43

*Primary Examiner*—Michael A. Masinick
*Attorney, Agent, or Firm*—Samuel Cohen; George J. Seligsohn

[57] ABSTRACT

By selecting the respective values of (1) the f-number of the camera objective, (2) the periodicity of a lenticular array used to image a periodic color encoding filter on a solid-state imager comprised of a periodic spatial pattern of discrete light-sensing cells, and (3) the object and image distances of the array, in accordance with the teachings of this invention, a high-resolution television picture without moire patterns may be generated.

8 Claims, 8 Drawing Figures

SOLID-STATE, COLOR-ENCODING TELEVISION CAMERA

This invention relates to a solid-state, color-encoding television camera and, more particularly, to such a camera employing a lenticular array for imaging a periodic color-encoding filter on a solid-state imager comprised of a periodic spatial pattern of discrete light-sensing cells.

Reference is made to U.S. Pat. No. 3,588,326, which issued to Frohbach on June 28, 1971, and U.S. Pat. No. 3,940,788, which issued to Abe, et al. on Feb. 24, 1976, each of which discloses a color-encoding television camera employing a lenticular array for imaging a periodic color-encoding filter on a photo-sensitive surface. In each of these patents, the photo-sensitive surface comprises a substantially uniform photo-cathode of a picture tube, such as a vidicon, rather than a solid-state imager comprised of a periodic spatial pattern of discrete light-sensing cells.

In any type of color-encoding television camera, it is necessary to image on a photo-sensitive surface within the camera, both an external scene and a periodic color-encoding filter. In early color-encoding television cameras, this was accomplished by the combination of an objective lens, which imaged the external scene on the periodic color-encoding filter, followed by a relay lens which imaged the periodic color-encoding filter (together with the image of the external scene) on the photo-sensitive surface. Both of the aforesaid prior art patents recognize that certain problems inherent in the use of a relay lens can be eliminated by employing an objective lens, that images the external scene directly on the camera's photo-sensitive surface, and a lenticular array that images the periodic filter on this photo-sensitive surface. However, because a lenticular array is comprised of periodic lenslets, each having a small aperture (of the order of 100 $\mu$m or less), there is a tendency for a lenticular array to produce undesirable moire patterns on the photo-sensitive surface. In order to cope with this problem, the color-encoding television camera disclosed in the aforesaid Abe, et al. patent includes a phase grating low pass filter as an additional element which minimizes moire patterns by operating as a diffuser. However, a diffuser reduces the sharpness of the light image on the photo-sensitive surface. Further, the use of a phase grating low pass filter adds to the cost of the camera.

A color-encoding television camera incorporating a solid-state imager comprised of a periodic spatial pattern of discrete light-sensing cells, such as a charge-coupled device (CCD) imager, is potentially of much lower cost than is a color-encoding television camera incorporating a vidicon. Typical dimensions of the periodicity of the discrete light-sensing cells employed in such an imager are on the order of 30 micrometers ($\mu$m) or so. Such a periodic spatial pattern of small discrete light-sensing cells requires a relatively higher degree of sharpness of the image thereon, than is required in the case of a uniform photo-sensitive surface of a photo-cathode of a vidicon. Therefore, a diffuser, such as the phase grating low pass filter disclosed in Abe, et al., is not a feasible solution to the problem of unwanted moire patterns in the image produced by a lenticular lens array on a solid-state imager comprised of a periodic spatial pattern of discrete light-sensing cells. Furthermore, such a phase grating low pass filter would substantially increase the cost of the solid-state, color-encoding television camera. The present invention is directed to a solid-state, color-encoding television camera which provides a low-cost solution to such moire patterns (and preferably to other imaging problems as well).

In accordance with the principles of the present invention, a solid-state, color-encoding television camera includes a solid-state imager comprised of a periodic spatial pattern of discrete light-sensing cells. An objective lens situated at a distance from the imager images light of wavelength $\lambda$ from a scene on the cells of the imager. The objective lens has an f-number $F_o$. A periodic color-encoding filter has a given period s and a duty cycle $\delta$ corresponding to a periodicity of the spatial pattern of discrete light-sensing cells. The filter is situated between the objective lens and the imager at a distance (a+b) from the imager. The lenticular array is comprised of periodic lenslets having a period l in correspondence with the period s of the filter. The array is situated at a distance a from the imager and at a distance b from the filter and images the filter on the imager with a magnification $m=b/a$. The image of the periodic filter on the imager has a period $p=s/m$, with the period p being substantially equal to and substantially in alignment with a given multiple (integer or non-integer) number of the spatial pattern period of discrete light-sensing cells. An image on the imager which contains no moire pattern that is resolvable by an observer is achieved in this solid-state, color-encoding television camera by employing respective selected values for each of the parameters $F_o$, a, b and l.

In the drawings:

FIGS. 1 and 1a schematically illustrate an embodiment of the present invention;

FIG. 1b illustrates a preferred embodiment of a periodic color-encoding filter that may be employed in the embodiment of FIGS. 1 and 1a;

FIGS. 2 and 3 schematically illustrate a CCD imager as an example of the type of solid-state imager that may be employed in FIGS. 1 and 1a;

FIG. 4 is a graph illustrating the relationship between the visibility of the moire pattern and the f-number of the objective lens of the television camera shown in FIGS. 1 and 1a;

Figure 1:
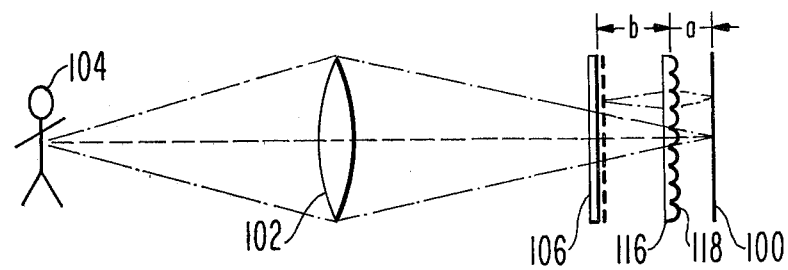
Figure 1A:
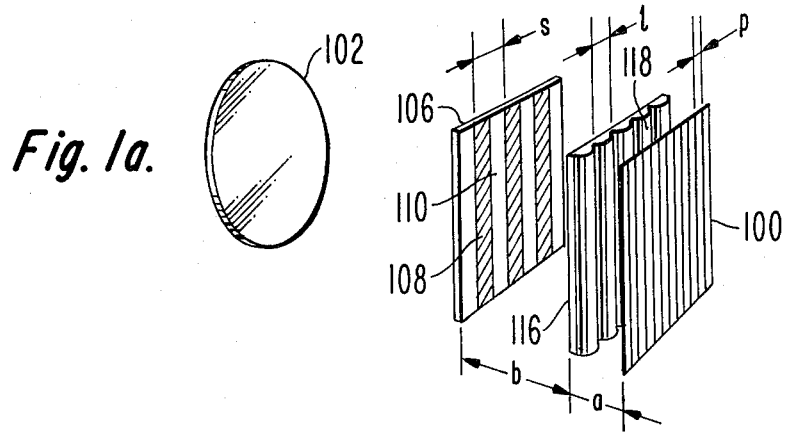
Figure 3:
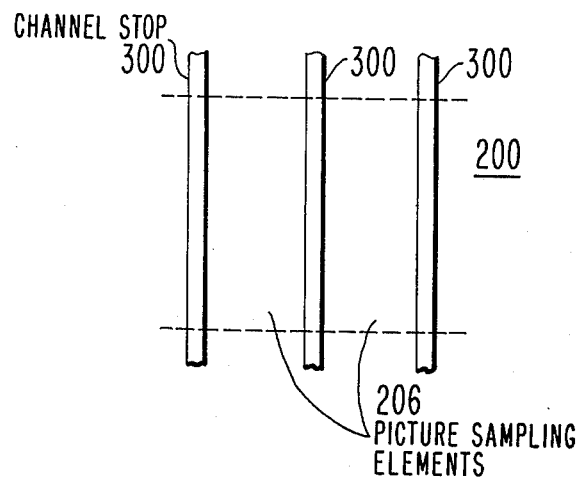

Referring to FIGS. 1 and 1a, a solid-state, color-encoding television camera, of the type incorporating the present invention, includes solid-state imager 100 comprised of a periodic spatial pattern of discrete light-sensing cells. Solid-state imager 100 may take the form of the CCD imager shown in FIGS. 2 and 3, discussed in detail below. Objective lens 102, which is situated at a distance from imager 100 and which has an f-number $F_o$, images light from an external scene (such as (man) 104) on imager 100. The imaged light includes a given optical wavelength $\lambda$.

Periodic color-encoding filter 106 is situated between objective lens 102 and imager 100 at a distance (a+b) from imager 100. As shown in FIG. 1a, periodic color-encoding filter 106 comprises periodic vertical stripes having a given period s. Each period of the color-encoding filter 106 of FIG. 1a is divided equally into a stripe of given color hue 108 and a clear stripe 110.

Thus, in the case of filter 106, the colored stripes 108 occur with a duty cycle δ of one-half. Because this stripe-pattern is one of the simplest pattern arrangements for a periodic color-encoding filter, it is shown, by way of example, in FIGS. 1 and 1a. However, other types of pattern arrangements may be employed for a periodic color-encoding filter.

Figure 1B:
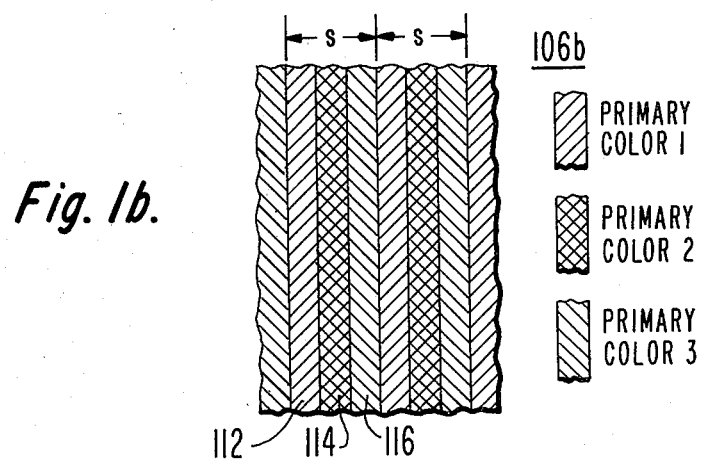

A preferred embodiment of a stripe pattern for a periodic color encoding filter, for use in a solid-state, color-encoding television camera incorporating the present invention, is shown in FIG. 1b. The periodic color-encoding filter 106b has a period s divided into three separate vertical stripes 112, 114, and 116, each of a different one of the three primary colors. The three primary colors may be the positive primary colors red, green and blue or, alternatively, the negative primary colors cyan, magenta and yellow or any combination of these colors and white, which allows the extraction of the basic red, green and blue context of the picture. As shown in FIG. 1b, each of the color stripes 112, 114 and 116 of periodic color filter 106b is of equal width. Therefore, each of the primary colors occurs with a duty cycle δ of one-third. However, is should be understood that it is not essential that all of the different color stripes have the same duty cycle. For instance, a solid-state imager may be less sensitive to one color hue than to other color hues of the color-encoding filter. In this case, it may be desirable to compensate for this lower sensitivity of the solid-state imager to this one color hue by increasing the relative duty cycle of that color stripe to which the solid-state imager is least sensitive with respect to the duty cycle of each of the other color stripes of the filter.

Figure 2:
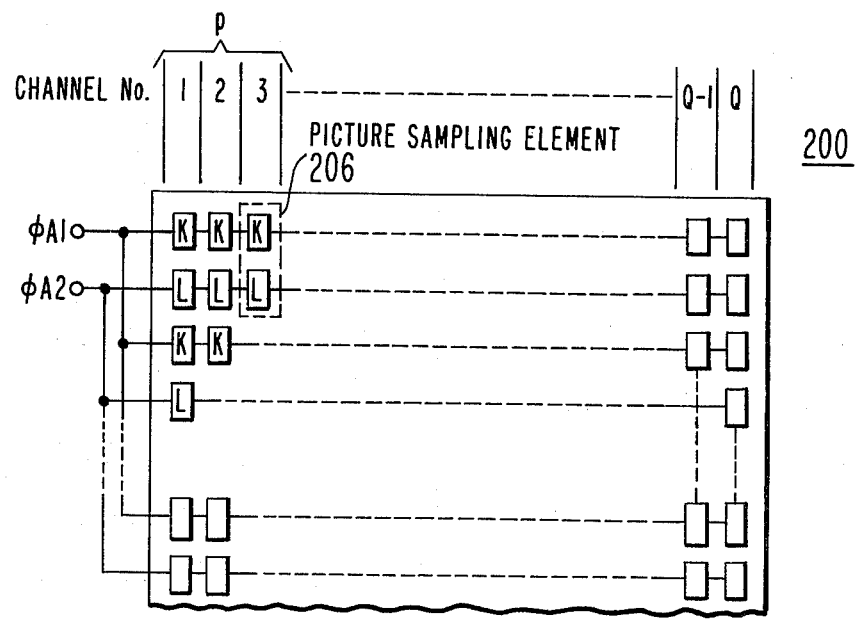

An example of a solid-state imager, which is suitable for use with color-encoding filter 106b, is shown schematically in FIG. 2. FIG. 2 is a CCD imager of the field transfer type (sometimes termed an imager of the "frame" transfer type) that is known in the art, and by way of example, is described in some detail in U.S. Pat. No. 4,032,976, which issued to P. A. Levine on June 28, 1977.

Briefly, as shown in FIG. 2, imager 200 is divided into Q separate channels, numbered 1 . . . Q, extending vertically in a column direction. Extending in the column direction, between each pair of adjacent channels, is a channel stop 300, shown in FIG. 3, for isolating charges in adjacent channels from each other. Each pair of adjacent electrodes K and L of each respective channel defines a discrete picture sampling element (shown as a dashed rectangle 206 in FIGS. 2 and 3). The electrodes K and L of each discrete picture sampling element, constitute 2-phase structures for insuring signal propagation in response to applied clock voltages $\phi A_1$ and $\phi A_2$, in a manner known in the CCD art.

As is indicated in FIG. 2, CCD solid-state imager 200 is comprised of a periodic spatial pattern of discrete light-sensing cells (i.e., picture sampling elements 206). In order to achieve a high-resolution television picture from a solid-state imager, such as imager 200, the dimensions of each picture sampling element must be quite small. For instance, each picture sampling element 206 of imager 200 has a typical width of about 30 μm. Furthermore, each discrete picture sampling element 206 integrates the light impinging thereon over its entire sub-area of imager 200. Therefore, in order to maintain high resolution in a television picture derived from imager 200, the optics of the television camera of which imager 200 is part must be capable of producing a relatively sharp image of a scene on imager 200, which image is properly aligned with the spatial pattern of discrete picture sampling elements 206. For instance, in one particular encoding scheme it is necessary to image the color stripes of periodic color-encoding filter 106b on imager 200 so that primary color 1 is imaged on channels 1, 4, 7 . . . ; primary color 2 is imaged on channels 2, 5, 8 . . . ; and primary color 3 is imaged on channels 3, 6, 9, . . . . It is further essential that such imaging take place without the introduction of resolvable moire patterns in the image (i.e., a television picture derived from such an imager should not display moire patterns). When designed in accordance of the teachings of the present invention, the optics of a solid-state, color-encoding television camera (of the type shown diagrammatically in FIG. 1) is capable of such imaging without resolvable moire patterns. Furthermore, optics incorporating the teachings of the present invention are optically-efficient (i.e., a relatively bright image, with respect to the available input light, is produced) and provide relatively little optical cross-talk (i.e., that proportion of light intended to be imaged on any given channel which, due to diffraction is actually imaged on an adjacent channel thereto, is quite small).

Returning to FIGS. 1 and 1a, lenticular array 116, comprising periodic cylindrical lenslets 118, is situated at a distance a from imager 100 and at a distance b from periodic color-encoding filter 106 (or filter 106b in FIG. 1b). Periodic lenslets 118 have a period of l in correspondence with the period s of the filter (i.e., the ratio of l to s is a constant, although these need not be one lenslet for each and every period of the color filter). As is shown in FIGS. 1, 1a, 1b and 2, the length of color stripes 108, 110, 112 and 114 of filters 106 and 106b, the axes of lenslets 118 of array 116 and the channels of imagers 100 and 200 are oriented vertically. Each of lenslets 118 exhibits a focal length f such that when array 116 occupies the position shown (i.e., an image distance a from imager 100 and an object distance b from filter 106 or 106b), the stripes of each period s of the filter are imaged on image 100 (or imager 200), as shown. As is known in optics, such an image of the filter on the imager exhibits a magnification $m = b/a$. This results in the image of the periodic filter on the imager having a period p equal to s/m. Each period p on the imager contains an image of all the color stripes in one period s of the filter. Therefore, in the particular encoding scheme described above, a period p of an image of one period s of filter 106b covers three adjacent channels of imager 200.

In accordance with the present invention, the f-number $F_o$ of objective lens 102, the image distance a, the object distance b and the period l 118 of lenticular array 116 have respective values such that no moire pattern resolvable by the imager is present in the image. Thus, moire patterns are avoided without the use of an additional diffuser. In quantitative terms, the selection of the proper respective values of $F_o$, a, b, and l may be made in accordance with the nine equations, discussed below.

First of all, in the arrangement shown in FIGS. 1 and 1a, the relationship among the parameters a, b, s, p, l and the focal distance f of each lenslet 118 of lenticular array 116 and the magnification m of the image of the color-encoding filter on imager 100 is determined in accordance with the following known equations of geometric optics:

$$f^{-1} = a^{-1} + b^{-1} \quad (1)$$

$$m = b/a = s/p \tag{2}$$

$$i^{-1} = s^{-1} + p^{-1} \tag{3}$$

Any combination of the six parameters a, b, f, s, p and l which fulfills equations (1) to (3) defines a lenticular array that images the filter on the imager. Thus, three degrees of freedom are left for selection of values of these parameters to provide good-performance optics which substantially prevent moire patterns resolvable by an observer from being present in the image. This may be accomplished by making the f-number $F_o$ of objective lens 102 significantly smaller than the ratio a/l, as indicated by equation (4)

$$F_0 << a/l \tag{4}$$

In practice, it is desirable that f-number $F_o$ of objective lens 102 be no greater than one-half the ratio of a to the lens period l of the imaged light, as indicated by equation (5)

$$F_o \leq a/2l \tag{b 5}$$

Figure 4:
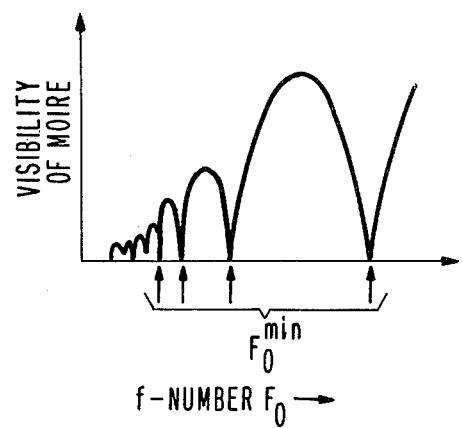

From equation (4) it is plain that unwanted moire patterns are a strong function of the f-number $F_o$ of the objective lens. A typical dependence relationship is shown by the graph of FIG. 4. As shown by this graph, the visibility of the moire pattern is defined by a series of successive cusps, with the peak amplitude of each successive cusp rising very rapidly with increasing f-number $F_o$ of the objective lens. Equations (4) and (5) indicate that for very small values of f-number $F_o$, the visibility of a moire pattern is relatively negligible. This is supported by FIG. 4, where even the peak amplitude of the cusps near the left of the figure is small. Therefore, for sufficiently small f-number $F_o$ of objective lens 102, the visibility of a moire pattern is negligible regardless of whether the exact value of $F_o$ is at a peak-amplitude position of a cusp or at a smaller-amplitude position of a cusp.

An objective lens having a sufficiently small f-number $F_o$ value to comply with equation (4) or (5) tends to be more expensive than an objective lens having a relatively high value of f-number $F_o$. Also, varying the f-number of the lens is a convenient way to adjust for scene brightness variations. However, as indicated in FIG. 4, a relatively large value of f-number $F_o$ may be still selected, if, and only if, the selected value of $F_o$ substantially coincides with one of the $F_o^{min}$ at which the amplitude of one of the larger peak amplitude cusps is near zero.

The exact shape of the respective cusps of FIG. 4 depends upon the shape of the television camera aperture (i.e., whether the aperture is circular, square, etc.). However, in any case, minimums occur for fixed given values of $F_o$. Therefore, by employing such fixed given values of $F_o$ (by appropriate aperture control of the television camera), the visibility of moire patterns is minimized for relatively large values f-number $F_o$. By way of example, for a square aperture, these minimum values are given by equation (6)

$$F_o^{min} = a/lk_A \text{ for } k_A = 1, 2, 3, \ldots \tag{6}$$

Similar expressions can be found for other aperture shapes. However, in these other cases, the respective values of $k_A$ will not necessarily be integers, as they are for a square aperture.

It has also been found that the visibility of moire patterns may be minimized at preferred values of the magnification ratio m [m being defined as in equation (2)]. Specifically, no moire patterns occur whenever the inverse of m is a positive integer $k_B$, as indicated by equation (7)

$$1/m = k_B \text{ for } k_B = 1, 2, 3 \ldots \tag{7}$$

In practice, it seems not advisable to use large values of $k_B$ ($k_B > 2$), since, as a consequence, the period s of the stripes become small and the stripes are then difficult to fabricate. A preferred value of $k_B$ is unity. In this case, m is equal to unity, which represents one-to-one imaging of the stripe pattern.

The design criteria for lenticular array 116 required to produce a sharp imaged stripe pattern will now be discussed. Due to diffraction by the individual small lenslets 118, the sharpness of the image is adversely affected by optical cross-talk $\gamma$. $\gamma$ is defined as the relative amount of (unwanted) light which is diffracted by each lenslet of lenticular array 116 from a given stripe of the stripe pattern into the image of adjacent stripes thereto. Equation (8), to a first order, gives the value of $\gamma$.

$$\gamma = a\lambda/2\delta pl \tag{8}$$

In equation (8), $\delta$ is the wavelength of the light and $\delta$ is the duty cycle of the stripe pattern. In practice, to avoid excessive signal-to-noise problems in the removal of unwanted color by electronic means, the value of $\gamma$ should be maintained at a value no greater than 0.3. For optimum performance, $\gamma$ should be no greater than 0.1. Equation (9) combines the criteria of equations (4) and $\gamma >> 1$, with $\gamma$ defined in equation (8), to provide the conditions for both minimizing moire patterns and minimizing optical cross-talk.

$$F_o << a/l << 2\delta p/\lambda \tag{9}$$

In equation (9), the selected value of $F_o$ should preferably be at most half the value of the ratio a/l and the ratio a/l should be less than 5 times the expression $2\delta p/\lambda$. The left hand side of equation (9) becomes irrelevant if any of the two techniques for minimizing moires as expressed by equation (6) or (7) is applied.

Figure 5:
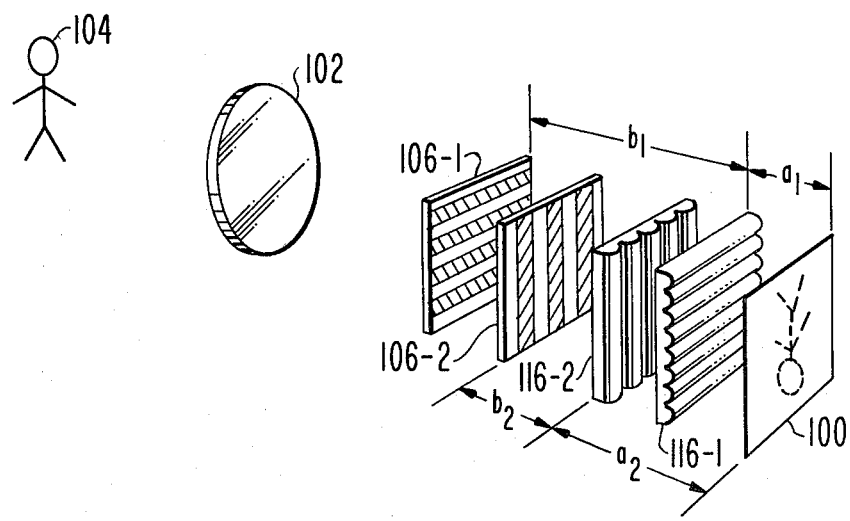
FIG. 5 illustrates a second embodiment of the present invention.

Reference is now made to FIG. 5, which shows a two-dimensional color-encoding filter for a solid-state television camera. In FIG. 5, imager 100, objective lens 102 and "man" 104 are identical in structure and function to the like-numbered elements of FIGS. 1 and 1a. Similarly, periodic color-encoding filter 106-2, having vertical stripes, and cylindrical lenticular array 116-2, having a vertical axis, are similar in structure and function to color-encoding filter 106 and lenticular array 116 of FIGS. 1 and 1a. FIG. 5 further includes periodic close-encoding filter 106-1 having horizontal stripes and cylindrical lenticular array 116-1 having a horizontal axis. Except for their angular orientation, filter 106-1 and lenticular array 116-1 are similar in structure and function to filter 106 and lenticular array 116 of FIGS. 1 and 1a. As shown in FIG. 5, lenticular array 116-1, which is located a distance $a_1$ from solid-state imager 100 images the stripes of filter 106-1, which is located at a distance $(a_1 + b_1)$ from imager 100 on imager 100.

Similarly, lenticular array 116-2, which is located at a distance $a_2$, from imager 100, images filter 106-2, which is located at a distance $(a_2+b_2)$ from imager 100 on imager 100. Although in FIG. 5 the distance $a_1$ and $a_2$ are different and the distance $b_1$ and $b_2$ are different, it should be understood that color-encoding filters 106-1 and 106-2 may lie in the same first given plane and cylindrical and lenticular arrays 116-1 and 116-2 may lie in the same second given plane. In principle, a spherical lenticular array could be substituted for two crossed cylindrical arrays. However, currently, fabrication of spherical lenticular arrays of sufficient optical quality is not practical.

The periodic color-encoding filter or filters employed in the present invention need not even be comprised of color stripes. For instance, the periodic color-encoding filter may have a more complex pattern as long as it is based on a rectangular unit cell. One such example is the assymetric honeycomb pattern color-encoding filter 600 shown in FIG. 6, where R is red, G is green and B is blue. The rectangular unit cell is indicated by box 602. Honeycomb pattern 600 can be generated by repeating unit cell 602 over the entire area of filter 600.

Figure 6:
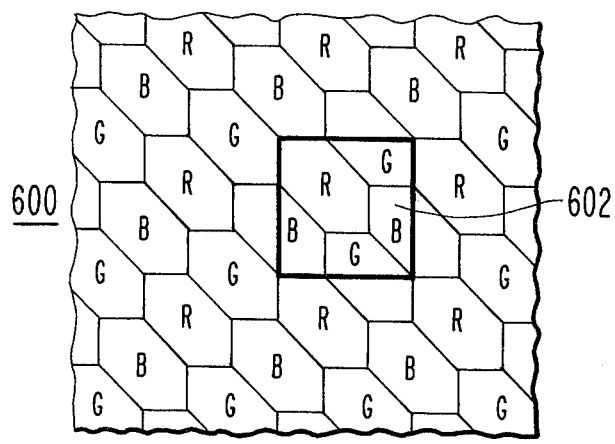
FIG. 6 illustrates an alternative embodiment of the periodic color-encoding filter that may be employed in the embodiment of FIG. 5.

The benefits of the present invention may be achieved in solid-state, two-dimensional color-encoding television cameras, of the type shown in FIGS. 5 or 6, by employing equations 1-9 in the same manner as is described above in connection with FIGS. 1 and 1a.

What is claimed is:

1. A solid-state, color-encoding television camera including:
    a solid-state imager comprised of a periodic spatial pattern of discrete light-sensing cells;
    an objective lens situated at a distance from said imager for imaging light of wavelength $\lambda$ from a scene on said cells of said imager, said objective lens having an f-number $F_o$,
    a periodic color-encoding filter having a given period s and a duty cycle $\delta$ which corresponds to a periodicity of said spatial pattern, said filter being situated between said objective lens and said imager at a distance $(a+b)$ from said imager, and
    a lenticular array comprising periodic lenslets having a period l in correspondence with the period s of said filter, said array being situated at a distance a from said imager and at a distance b from said filter and imaging said filter on said imager with a magnification m equal to b/a, said image of said periodic filter on said imager having a period p equal to s/m, with said period p being substantially equal to and substantially in alignment with a multiple of the spatial pattern period of discrete light-sensing cells,
    wherein $F_o$, a, b and l have respective selected values such that substantially no moire pattern resolvable by an observer is present in said image, and
    wherein said television camera has a given shape aperture, and wherein the selected value of $F_o$ is equal to the quotient of the selected value of a divided by the product of the selected value of l and a selected positive number dependent on said given shape which results in said moire pattern in said image being a minimum.

2. The television camera defined in claim 1, wherein said given shape aperture is a square aperture and wherein said selected positive number is a positive integer.

3. A solid state, color-encoding television camera including:
    a solid-state imager comprised of a periodic spatial pattern of discrete light-sensing cells;
    an objective lens situated at a distance from said imager for imaging light of wavelength $\lambda$ from a scene on said cells of said imager, said objective lens having an f-number $F_o$,
    a periodic color-encoding filter having a given period s and a duty cycle $\delta$ which corresponds to a periodicity of said spatial pattern, said filter being situated between said objective lens and said imager at a distance $(a+b)$ from said imager, and
    a lenticular array comprising periodic lenslets having a period l in correspondence with the period s of said filter, said array being situated at a distance a from said imager and at a distance b from said filter and imaging said filter on said imager with a magnification m equal to b/a, said image of said periodic filter on said imager having a period p equal to s/m, with said period p being substantially equal to and substantially in alignment with a multiple of the spatial pattern period of discrete light-sensing cells,
    wherein $F_o$, a, b and l have respective selected values such that substantially no moire pattern resolvable by an observer is present in said image, and
    wherein the optical cross talk, as defined by the product of the selected value of a and the wavelength $\lambda$ divided by twice the product of the selected value of l and the respective values of $\delta$ and p, is no greater than 0.3.

4. The television camera defined in claim 3, wherein said optical cross-talk is no greater than 0.1.

5. A solid-state, color-encoding television camera including:
    a solid-state imager comprised of a periodic spatial pattern of discrete light-sensing cells;
    an objective lens situated at a distance from said imager for imaging light of wavelength $\lambda$ from a scene on said cells of said imager, said objective lens having an f-number $F_o$,
    a periodic color-encoding filter having a given period s and a duty cycle $\delta$ which corresponds to a periodicity of said spatial pattern, said filter being situated between said objective lens and said imager at a distance $(a+b)$ from said imager, and
    a lenticular array comprising periodic lenslets having a period l in correspondence with the period s of said filter, said array being situated at a distance a from said imager and at a distance b from said filter and imaging said filter on said imager with a magnification m equal to b/a, said image of said periodic filter on said imager having a period p equal to s/m, with said period p being substantially equal to and substantially in alignment with a multiple of the spatial pattern period of discrete light-sensing cells,
    wherein $F_o$, a, b and l have respective selected values such that substantially no moire pattern resolvable by an observer is present in said image, and
    wherein the selected value of $F_o$ is at most half the quotient of the selected value of a divided by l, which, in turn, is at most a fifth of the product of twice the respective values of $\delta$ and p divided by the wavelength $\lambda$.

6. A solid-state, color-encoding television camera including:
    a solid-state imager of a spatial pattern comprised of discrete light-sensing cells having first and second periodicities which are oriented substantially perpendicular to one another, an objective lens situated at a distance from said imager for imaging light of wavelength $\lambda$ from a scene on said cells of said imager, said objective lens having an f-number $F_o$, a periodic color-encoding filter having a first period $s_1$ section that has a duty cycle $\delta_1$, said first period $s_1$ section corresponding with said first periodicity of the said spatial pattern, said first filter section being situated between said objective lens and said imager at a distance $(a_1+b_1)$ from said imager, said filter having a second period $s_2$ section that has a duty cycle $\delta_2$, said second filter section being situated between said objective lens and said imager at a distance $(a_2+b_2)$ from said imager, a lenticular array comprising first periodic lenslets having a period $l_1$ in correspondence with the period $s_1$ of said first filter section, said first period lenslets being situated at a distance $a_1$ from said imager and a distance $b_1$ from said first filter section and imaging said first filter section on said imager with a magnification $m_1$ equal to $b_1/a_1$, said imager of said first filter section on said imager having a period $p_1$ equal to $s_1/m_1$, with said period $p_1$ being substantially equal to and substantially in alignment with a multiple of the first periodicity periods of the spatial pattern of discrete light-sensing cells, said array comprising second periodic lenslets having a period $l_2$ in correspondence with the period $s_2$ of said second filter section, said second periodic lenslets being situated at a distance $a_2$ from said imager and a distance $b_2$ from said second filter section and imaging said second filter section on said imager with a magnification $m_2$ equal to $b_2/a_2$, said image of said second filter section on said imager having a period $p_2$ equal to $s_2/m_2$, with said period $p_2$ being substantially equal to and substantially in alignment with a multiple of the second periodicity periods of the spatial pattern of discrete light sensing cells, wherein $F_1$, $a_1$, $a_2$, $b_1$, $b_2$, $l_1$ and $l_2$ have respective selected values such that substantially no moire pattern resolvable by an observer is present in said image.

7. The television camera defined in claim 6, wherein $a_1$ is equal to $a_2$ and $b_1$ is equal to $b_2$, whereby said first and second periodic lenslets lie in the same plane.

8. The television camera defined in claim 6, wherein both said first and second periodic lenslets are cylindrical lenslets.

* * * * *